(12) United States Patent
Thapliyal et al.

(10) Patent No.: US 10,042,528 B2
(45) Date of Patent: Aug. 7, 2018

(54) SYSTEMS AND METHODS OF DYNAMICALLY RENDERING A SET OF DIAGRAM VIEWS BASED ON A DIAGRAM MODEL STORED IN MEMORY

(71) Applicant: GetGo, Inc., Boston, MA (US)

(72) Inventors: Ashish V. Thapliyal, Santa Barbara, CA (US); Nikolay Avrionov, Santa Barbara, CA (US)

(73) Assignee: GetGo, Inc., Boston, MA (US)

( * ) Notice: Subject to any disclaimer, the term of this patent is extended or adjusted under 35 U.S.C. 154(b) by 331 days.

(21) Appl. No.: 14/840,617

(22) Filed: Aug. 31, 2015

(65) Prior Publication Data

US 2017/0060389 A1 Mar. 2, 2017

(51) Int. Cl.
*G06F 17/30* (2006.01)
*G06K 9/00* (2006.01)
*G06T 3/00* (2006.01)
*G06F 8/00* (2018.01)
*G06F 3/0484* (2013.01)
*G06F 8/34* (2018.01)

(52) U.S. Cl.
CPC ............ *G06F 3/04842* (2013.01); *G06F 8/34* (2013.01); *G06F 2203/04806* (2013.01)

(58) Field of Classification Search
CPC .. G06F 3/048; G06F 3/00; G06F 2203/04806; G06F 17/30; G06F 17/00; G06F 8/30; G06T 3/00; G06K 9/00
See application file for complete search history.

(56) References Cited

U.S. PATENT DOCUMENTS

| 8,132,116 B1* | 3/2012 | Schendel | G06F 3/04817 715/764 |
| 8,548,973 B1* | 10/2013 | Kritt | G06F 17/30867 707/706 |
| 8,730,269 B2 | 5/2014 | Pinto et al. | |
| 8,789,144 B2 | 7/2014 | Mazzaferri et al. | |
| 8,819,561 B2 | 8/2014 | Gupta et al. | |
| 8,869,235 B2 | 10/2014 | Qureshi et al. | |
| 9,110,581 B2 | 8/2015 | Momchilov | |
| 9,152,436 B2 | 10/2015 | Momchilov | |
| 9,183,380 B2 | 11/2015 | Qureshi et al. | |
| 9,215,212 B2 | 12/2015 | Reddy et al. | |
| 2006/0161890 A1* | 7/2006 | Green | G06F 8/30 717/114 |

(Continued)

*Primary Examiner* — Hugo Molina
(74) *Attorney, Agent, or Firm* — BainwoodHuang (57) ABSTRACT

A technique provides, to a user, a set of diagram views of a diagram model stored in memory. The technique involves obtaining, by processing circuitry, electronic access to the diagram model stored in the memory. The diagram model includes a group of objects. Each object has a defined object size. The technique further involves, after obtaining electronic access to the diagram model stored in the memory, performing, by the processing circuitry, an object selection operation that selects an initial set of objects from the group of objects based on the defined object size of each object of the group of objects. The technique further involves, after performing the object selection operation, rendering, by the processing circuitry, an initial diagram view of the diagram model on an electronic display to the user, the initial diagram view including the initial set of objects.

18 Claims, 7 Drawing Sheets

(56) References Cited

U.S. PATENT DOCUMENTS

| | | | |
|---|---|---|---|
| 2008/0104225 A1* | 5/2008 | Zhang | H04L 67/36 |
| | | | 709/224 |
| 2009/0027392 A1* | 1/2009 | Jadhav | G06F 17/30958 |
| | | | 345/440 |
| 2009/0228830 A1* | 9/2009 | Herz | G06F 3/04817 |
| | | | 715/808 |
| 2010/0021069 A1* | 1/2010 | Fan | G06K 9/00463 |
| | | | 382/224 |
| 2012/0102549 A1 | 4/2012 | Mazzaferri et al. | |
| 2013/0083012 A1* | 4/2013 | Han | G05B 15/02 |
| | | | 345/419 |
| 2013/0139103 A1 | 5/2013 | Laborczfalvi et al. | |
| 2013/0208013 A1* | 8/2013 | Yuu | G06T 3/40 |
| | | | 345/661 |
| 2014/0267294 A1* | 9/2014 | Ma | G06T 11/206 |
| | | | 345/440 |
| 2014/0344736 A1 | 11/2014 | Ryman et al. | |
| 2015/0169521 A1* | 6/2015 | Leventhal | G06F 17/227 |
| | | | 715/234 |
| 2015/0235129 A1* | 8/2015 | Tchakerian | G06Q 50/01 |
| | | | 706/50 |
| 2016/0048517 A1* | 2/2016 | Jensen | G06F 17/3053 |
| | | | 707/749 |

\* cited by examiner

SYSTEMS AND METHODS OF DYNAMICALLY RENDERING A SET OF DIAGRAM VIEWS BASED ON A DIAGRAM MODEL STORED IN MEMORY

BACKGROUND

A conventional document viewing program allows a human to view content of a document (or file) such as flowcharts, tables, and text. A suitable format for such a document is the portable document format (PDF), and a suitable program for the conventional document viewing program is a PDF reader (or viewer).

During operation, the human opens the document using the conventional document viewing program, and the conventional document viewing program responds by displaying content of the document. If the human wishes to enlarge the displayed content, the human clicks on an enlarge button (e.g., a button with a "+" sign), and the conventional document viewing program enlarges the displayed content. Likewise, if the human wishes to shrink (or reduce) the displayed content, the human clicks on a shrink button (e.g., a button with a "−" sign), and the conventional document viewing program shrinks the displayed content.

SUMMARY

It should be understood that there are deficiencies to the above-described conventional document viewing program. For example, the document may include content having multiple levels of information such as hierarchically arranged illustrations of objects (i.e., objects containing other objects), flowcharts of steps that include sub-steps, plans and specifications that include further details, as well as other types of hierarchical content. However, suppose that a human is currently viewing some of the content of such a document using the above-described conventional document viewing program. When the human clicks on the enlarge button, the conventional document viewing program uniformly enlarges the whole view, i.e., everything that is displayed is enlarged to scale. Similarly, when the human clicks on the shrink button, the conventional document viewing program uniformly reduces the whole view, i.e., everything that is displayed is reduced to scale. Unfortunately, the human might not desire these full enlargement/reduction effects.

Rather, the human may prefer to "zoom in" and simply view certain new elements or components that were entirely hidden or omitted in an initial view. Additionally, the human might prefer to "zoom out" and completely hide or omit certain elements or components that were in the initial view. Furthermore, while zooming in or zooming out, the human might want to continue viewing certain relationships (e.g., as connecting lines) between particular elements/components. Moreover, the human might want to simply view certain types of elements and/or relationships while fully hiding other types of elements and/or relationships, i.e., to restrict the view. Unfortunately, the above-described conventional document viewing program does not make any adjustments to the displayed content, but simply magnifies or shrinks all of the content in a flat/static manner.

In contrast to the above-described conventional document viewing program which enlarges or shrinks a whole view in a flat/static manner, improved techniques are directed to providing, to a user, a set of diagram views of a diagram model stored in memory. In particular, the user is able to work at different levels using a zoom feature which selects which objects (e.g., shapes, graphics, etc.) and associated relations (e.g., lines, arrows, etc.) to display to the user. For example, suppose that a set of initial objects is rendered to the user. When the user zooms in via the zoom feature, the techniques (i) show child objects that were initially hidden from view because they were considered too small to see and (ii) renders associated relations from the initial objects to the child objects (e.g., illustrated as connecting lines between the objects). Furthermore, when the user zooms out via the zoom feature, the techniques (i) show parent objects that were initially hidden from view because they were considered too large to see and (ii) renders associated relations from the initial objects to the parent objects. Moreover, text labels for removed objects/relations can be removed while text labels for currently visible objects/relations can be scaled up so that these text labels are easy for the user to read. In some arrangements, the user is able to focus on specific aspects (or domains) of the diagram model by selecting which objects/relations/domains/etc. the user wants to see.

One embodiment is directed to a method of providing, to a user, a set of diagram views of a diagram model stored in memory. The method includes obtaining, by processing circuitry, electronic access to the diagram model stored in the memory. The diagram model includes a group of objects. Each object has a defined object size. The method further includes, after obtaining electronic access to the diagram model stored in the memory, performing, by the processing circuitry, an object selection operation that selects an initial set of objects from the group of objects based on the defined object size of each object of the group of objects. The method further includes, after performing the object selection operation, rendering, by the processing circuitry, an initial diagram view of the diagram model on an electronic display to the user, the initial diagram view including the initial set of objects. Accordingly, the user is able to view an appropriate level of detail of the diagram model.

In some arrangements, performing the object selection operation includes, for each object of the group of objects, comparing the defined object size of that object to an initial object size threshold, adding that object to the initial set of objects when the defined object size of that object is greater than the initial object size threshold, and omitting that object from the initial set of objects when the defined object size of that object is less than the initial object size threshold. The initial object size threshold may be a default setting, the last setting entered by the user, and so on.

In some arrangements, the diagram model further includes a group of relationships. Each relationship connects to at least two objects of the group of objects. In these arrangements, the method further includes performing a relationship selection operation that selects, for representation in the initial diagram view, an initial set of relationships from the group of relationships based on the objects that each relationship of the group of relationships connects to.

In some arrangements, performing the relationship selection operation includes, for each relationship of the group of relationships, identifying whether that relationship connects to at least two objects or child objects of the initial diagram view or whether that relationship does not connect to at least two objects or child objects of the initial diagram view. If so, that relationship is added to the set of relationship. If not, that relationship is omitted from the initial set of relationships.

In some arrangements, rendering the initial diagram view of the diagram model includes, based on the initial set of relationships, displaying an initial set of connecting lines among the initial set of objects of the initial diagram view.

In some arrangements, each relationship has a relationship name. In these arrangements, displaying the initial set of connecting lines includes:

(A) forming a single connecting line based on multiple relationships of the initial set of relationships,
(B) forming a composite connecting line name from the relationship names of the multiple relationships, and
(C) outputting, in the initial diagram view, the single connecting line and the composite connecting line name to represent the multiple relationships of the initial set of relationships.

In some arrangements, each relationship name of the multiple relationships has a first text size. In these arrangements, outputting the single connecting line and the composite connecting line name includes presenting the composite connecting line name at a second text size that is greater than the first text size to scale up the composite connecting line name for easy viewing by the user.

In some arrangements, the method further includes receiving a zoom-out command from the user. In these arrangements, the method further includes, in response to the zoom-out command and for each object of the group of objects, comparing the defined object size of that object to a zoomed out object size threshold that is larger than the initial object size threshold, adding that object to a second set of objects when the defined object size of that object is greater than the zoomed out object size threshold, and omitting that object from the second set of objects when the defined object size of that object is less than the zoomed out object size threshold. Additionally, the method includes rendering a second diagram view of the diagram model on the electronic display to the user, the second diagram view including the second set of objects.

In some arrangements, the method further includes receiving a zoom-in command from the user. In these arrangements, the method further includes, in response to the zoom-in command and for each object of the group of objects, comparing the defined object size of that object to a zoomed in object size threshold that is smaller than the initial object size threshold, adding that object to a second set of objects when the defined object size of that object is greater than the zoomed in object size threshold, and omitting that object from the second set of objects when the defined object size of that object is less than the zoomed in object size threshold. Furthermore, the arrangements include rendering a second diagram view of the diagram model on the electronic display to the user, the second diagram view including the second set of objects.

In some arrangements, rendering the second diagram view of the diagram model includes displaying a second set of connecting lines among the second set of objects of the second diagram view. Here, the second set of connecting lines is different from the initial set of connecting lines.

In some arrangements, each object has an object name, and the method further includes receiving, from the user, a search command having a keyword. In these arrangements, the method further includes, in response to the search command and for each object of the initial set of objects, identifying whether the object name of that object includes the keyword, adding that object to a second set of objects when the object name of that object includes the keyword, and omitting that object from the second set of objects when the object name of that object does not include the keyword. Also, the method includes rendering a second diagram view of the diagram model on the electronic display to the user, the second diagram view including the second set of objects.

In some arrangements, each relationship has a relationship name, and the method further includes, in response to the search command and for each relationship of the initial set of relationships, identifying whether the relationship name of that relationship includes the keyword, adding that relationship to a second set of relationships when the relationship name of that relationship includes the keyword, and omitting that relationship from the second set of relationships when the relationship name of that relationship does not include the keyword. In these arrangements, the method further includes, based on the second set of relationships, displaying a second set of connecting lines among the second set of objects of the second diagram view.

In some arrangements, the method further includes storing, in the memory, current metadata that includes the initial set of objects and the initial set of relationships. Such arrangements enable the user to re-display the initial set of connecting lines among the initial set of objects after a period of no electronic access to the diagram model stored in the memory.

Another embodiment is directed to a computer program product having a non-transitory computer readable medium that stores a set of instructions to provide, to a user, a set of diagram views of a diagram model stored in memory. The set of instructions, when carried out by computerized circuitry, causes the computerized circuitry to perform a method of:

(A) obtaining electronic access to the diagram model stored in the memory, the diagram model including a group of objects, each object having a defined object size;
(B) after obtaining electronic access to the diagram model stored in the memory, performing an object selection operation that selects an initial set of objects from the group of objects based on the defined object size of each object of the group of objects; and
(C) after performing the object selection operation, rendering an initial diagram view of the diagram model on an electronic display to the user, the initial diagram view including the initial set of objects.

In some arrangements, the computer program product further includes providing a zoom control to the user. The zoom control provides:

(i) access to a zoom-out operation that is constructed and arranged to, for each object of the group of objects, compare the defined object size of that object to a zoomed out object size threshold that is larger than the initial object size threshold, add that object to a second set of objects when the defined object size of that object is greater than the zoomed out object size threshold, omit that object from the second set of objects when the defined object size of that object is less than the zoomed out object size threshold, and render a second diagram view of the diagram model on the electronic display to the user, the second diagram view including the second set of objects, and (ii) access to a zoom-in operation that is constructed and arranged to, for each object of the group of objects, compare the defined object size of that object to a zoomed in object size threshold that is smaller than the initial object size threshold, add that object to a third set of objects when the defined object size of that object is greater than the zoomed in object size threshold, omit that object from the third set of objects when the defined object size of that object is less than the zoomed in object size threshold, and render a third diagram view of the diagram model on the electronic display to the user, the third diagram view including the third set of objects.

Yet another embodiment is directed to an electronic apparatus that includes an electronic display, memory, and control circuitry coupled to the electronic display and the memory. The memory stores instructions that, when carried out by the control circuitry, cause the control circuitry to:
(A) access a diagram model stored in the memory, the diagram model including a group of objects, each object having a defined object size,
(B) upon accessing to the diagram model stored in the memory, performing an object selection operation that selects an initial set of objects from the group of objects based on the defined object size of each object of the group of objects, and
(C) after performing the object selection operation, rendering an initial diagram view of the diagram model on an electronic display to the user, the initial diagram view including the initial set of objects.

It should be understood that, in the cloud context, some electronic circuitry is formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry that are involved in providing a set of diagram views of a diagram model to a user.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing, to a user, a set of diagram views of a diagram model stored in memory. In particular, the user is able to work at different levels using a zoom feature which selects which objects and associated relations (e.g., lines, arrows, etc.) to display to the user. For example, suppose that a set of initial objects is displayed to the user. When the user zooms in via the zoom feature, the technique (i) shows child objects that were initially hidden from view because they were considered too small to see and (ii) displays associated relations from the initial objects to the child objects (e.g., displayed as connecting lines between the objects). Additionally, when the user zooms out via the zoom feature, the technique (i) shows parent objects that were initially hidden from view because they were considered too large to see and (ii) displays associated relations from the initial objects to the parent objects. Moreover, text labels for removed objects/relations can be removed while text labels for currently visible objects/relations can be scaled up so that these text labels are easy for the user to read. In some arrangements, the user is able to focus on specific aspects (or domains) of the diagram model by selecting which objects/relations the user wants to see.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
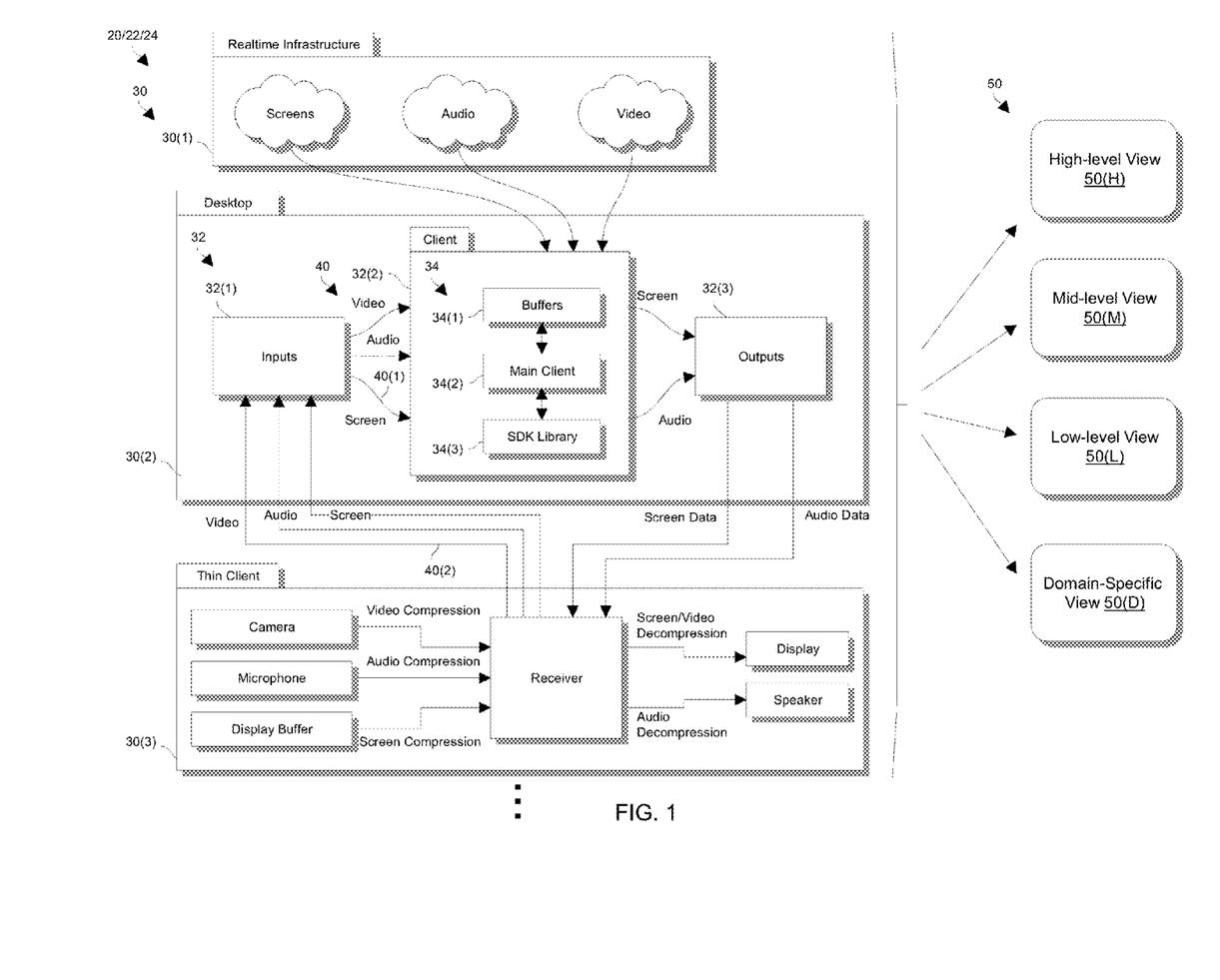
FIG. 1 is a block diagram of a diagram model which is stored in memory.

FIG. 1 shows a diagram model 20 for a system of hierarchically arranged components. The diagram model 20 is stored in computer memory 22 in a non-volatile manner (e.g., on disk), and includes a set of data structures 24 (i.e., objects and relationships between the objects) which represent the components.

For illustrations purposes, the diagram model 20 includes a set of high-level objects 30(1), 30(2), 30(3), . . . (collectively, high-level objects 30), a set of mid-level objects 32(1), 32(2), 32(3), . . . (collectively, mid-level objects 32), and a set of low-level objects 34(1), 34(2), 34(3), . . . (collectively, low-level objects 34). The set of high-level objects 30 represent high-level components of the system, the set of mid-level objects 30 represent mid-level components of the system, and the set of low-level objects 30 represent low-level components of the system.

Each object 30, 32, 34 may have a parent object and one or more child objects thus forming an object hierarchy having the shape of an inverted tree. For example, the objects 32(1), 32(2), 32(3) are child objects of the parent object 30(2). Similarly, the objects 34(1), 34(2), 34(3) are child objects of the parent object 32(2). It should be understood that the diagram model 20 has three levels of hierarchy by way of example only, and that the diagram model 20 may have more or less levels of hierarchy (e.g., two, four, and so on).

The diagram model 20 further includes, as another type of data structure 24, relationships 40 between the objects. Such relationships may represent parent/child relations, signals, access, directional flows of information, orientations, perspectives, other input/output behaviors, and so on. For example, the diagram model 20 includes a relationship 40(1) (see arrow 40(1)) which extends between the objects 32(1), 32(2) to represent "screen input" from the object 32(1) to the object 32(2). As another example, the diagram model 20 further includes a relationship 40(2) (see arrow 40(2)) which extends between the child objects of parent objects 30(2), 30(3) to represent "video input" from the object 30(2) to the object 30(3).

It should be understood that each relationship 40 identifies a relationship between at least two objects but that other types are relationships are suitable for use as well (e.g., signal directions, how components are connected, how components compare to each other, etc.). It should be understood that such relationships 40 are displayed in the form of connecting lines between object graphics (or simply objects).

At this point, it should be understood that a user may prefer to see particular views 50 of the diagram model 20 on an electronic display (e.g., a video screen of a general purpose computer, a touch screen of a tablet device or a smart phone, a smart television, a projection, etc.). For example, the user may wish to see a high-level view 50(H) which only shows the high-level objects 30 and certain relationships 40. As another example, the user may wish to see a mid-level view 50(M) which only shows the mid-level objects 32 and certain relationships 40. As yet another example, the user may wish to see a mid-level view 50(M) which only shows the mid-level objects 32 and certain relationships 40. Moreover, the user may wish to see a domain-specific view 50(D) (i.e., a view from a particular perspective).

It should be understood that the data for the diagram model 20 may originate in a variety of forms. Along these lines, the source of content for the diagram model 20 may be a conventional file (or set of files) containing one or more diagrams, charts, figures, etc. created earlier using a conventional drawing or graphics tool. Examples of suitable file formats include PDF, XML, and ODF, among others.

The electronic apparatus 60 then processes the data from such a file to obtain the objects and relationships of the diagram model 20 (also see FIG. 1). In some arrangements, such processing involves directly reading information from data structures from the file, and converting that information into the objects and relationships (e.g., inputting predefined electronic object and relationship data for use by the electronic apparatus 60). In other arrangements, such processing involves performing advanced operations such as pattern recognition (e.g., shape recognition, line/edge recognition, etc.), data extraction from the output of a conventional rendering application or a document scan, etc. In yet other arrangements, such processing involves both processing techniques and/or others (e.g., a human may manually create/enter various objects and relationships via the electronic apparatus 60), and so on. Further details will now be provided with reference to FIG. 2.

Figure 2:
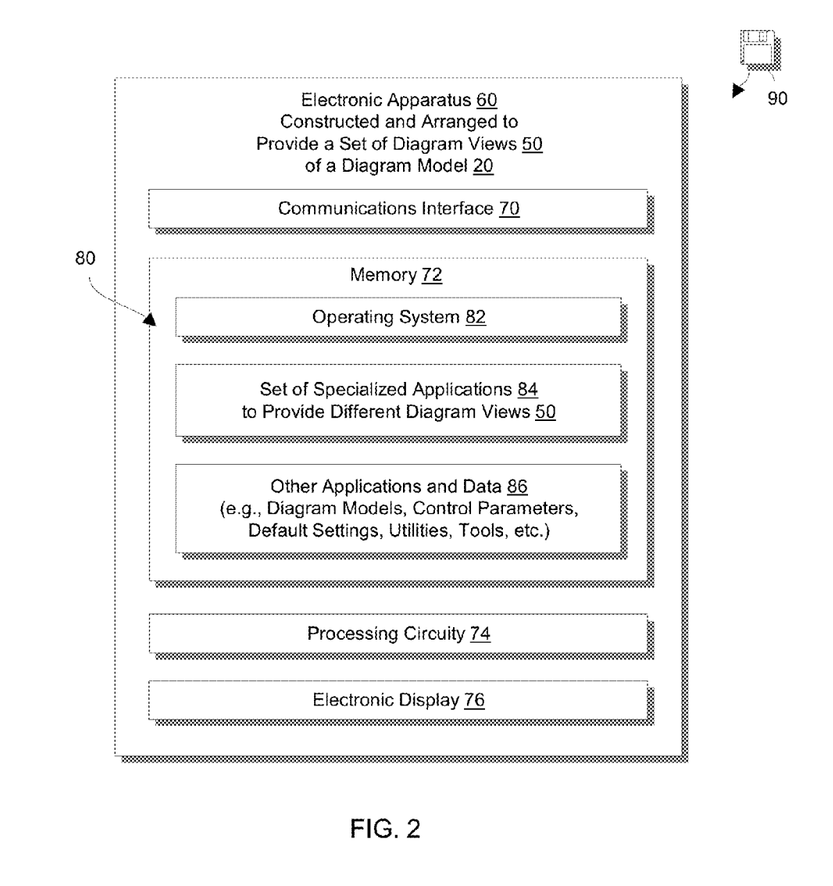
FIG. 2 is a block diagram of an electronic apparatus which is suitable for providing, to a user, a set of diagram views of the diagram model.

FIG. 2 shows an electronic apparatus 60 which provides, to a user, a set of diagram views 50 of a diagram model 20 (also see FIG. 1). The electronic apparatus 60 includes a communications interface 70, memory 72, processing circuitry 74, and an electronic display 76.

The communications interface 70 is constructed and arranged to connect the electronic apparatus 60 to a communications medium. Along these lines, the communications interface 70 enables the electronic apparatus 60 to communicate with one or more external devices. Such communications may be line-based or wireless (i.e., IP-based, cellular, combinations thereof, and so on).

The memory 72 is intended to represent both volatile storage (e.g., DRAM, SRAM, etc.) and non-volatile storage (e.g., flash memory, magnetic disk drives, etc.). The memory 72 stores a variety of software constructs 80 including an operating system 82, a set of specialized applications 84, and other applications and data 86.

The processing circuitry 74 is constructed and arranged to operate in accordance with the various software constructs 80 stored in the memory 72. For example, the processing circuitry 74, when executing the operating system 82, manages various resources of the electronic apparatus 60 (e.g., memory allocation, processor cycles, hardware compatibility, etc.). Additionally, the processing circuitry 74 operating in accordance with the set of applications 84 forms specialized control circuitry to perform specialized operations such as providing a set of diagram views 50 of a diagram model 20 (FIG. 1). The other applications and data 86 represent one or more diagram models 20 stored in memory (also see FIG. 1), control parameters, default settings, utilities, tools, and so on. In some arrangements, the other applications and data 86 include an online collaboration client (or agent software) which enables the electronic apparatus 60 to join and participate in online meetings, conferences, etc. in which the viewers are able to see the various views 50 of the diagram model 20.

It should be understood that the above-mentioned processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the electronic apparatus 60. The computer program product 90 has a non-transitory and non-volatile computer readable medium which stores a set of instructions to control one or more operations of the electronic apparatus 60. Examples of suitable computer readable storage media include tangible articles of manufacture and apparatus which store instructions in a non-volatile manner such as CD-ROM, flash memory, disk memory, tape memory, and the like.

During operation, the specialized control circuitry (which is formed by the processing circuitry 74 executing the set of applications 84) renders the various views 50 of the diagram model 20 in response to commands from a user. Along these lines, the electronic apparatus 60 (FIG. 2) may operate as the user's workstation thus enabling the user to perform useful work. For example, the user may be the presenter during an online conference or meeting and wish to share one or more of the views 50 with an audience during a collaborative discussion. Accordingly, the other conference participants are able to see the views 50, as well as share audio content (e.g., ask questions and inject comments) to form a collaborative exchange even though the conference participants may be scattered among remote geographical locations. Further details will now be provided with reference to FIGS. 3 through 6.

Figure 3:
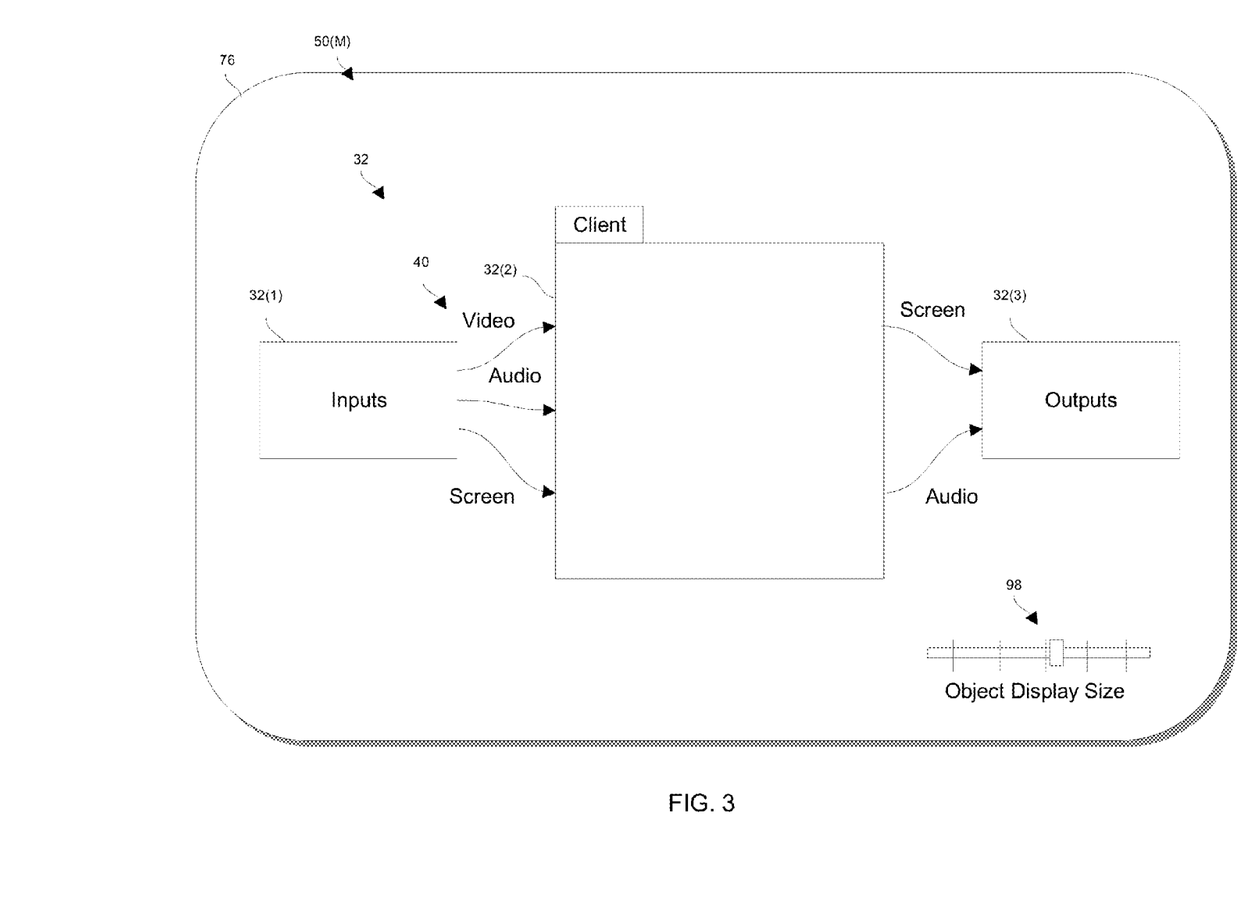
FIG. 3 is an example mid-level view of the diagram model of FIG. 1.
Figure 4:
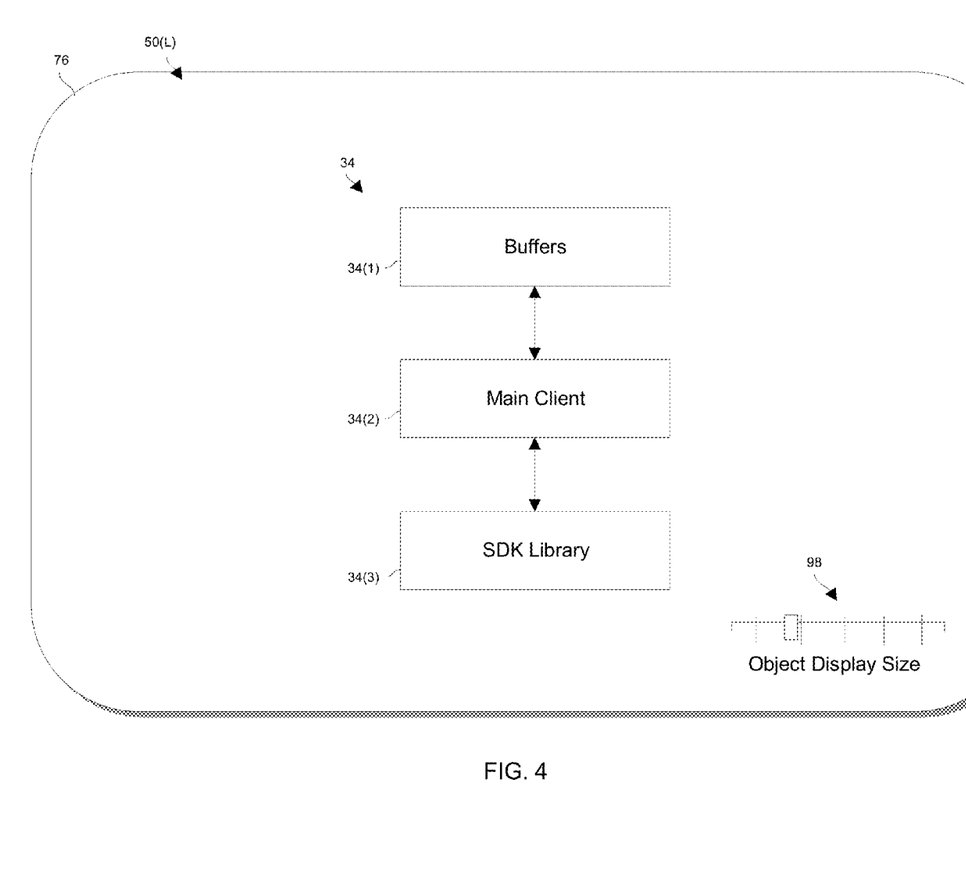
FIG. 4 is an example low-level view of the diagram model of FIG. 1.
Figure 5:
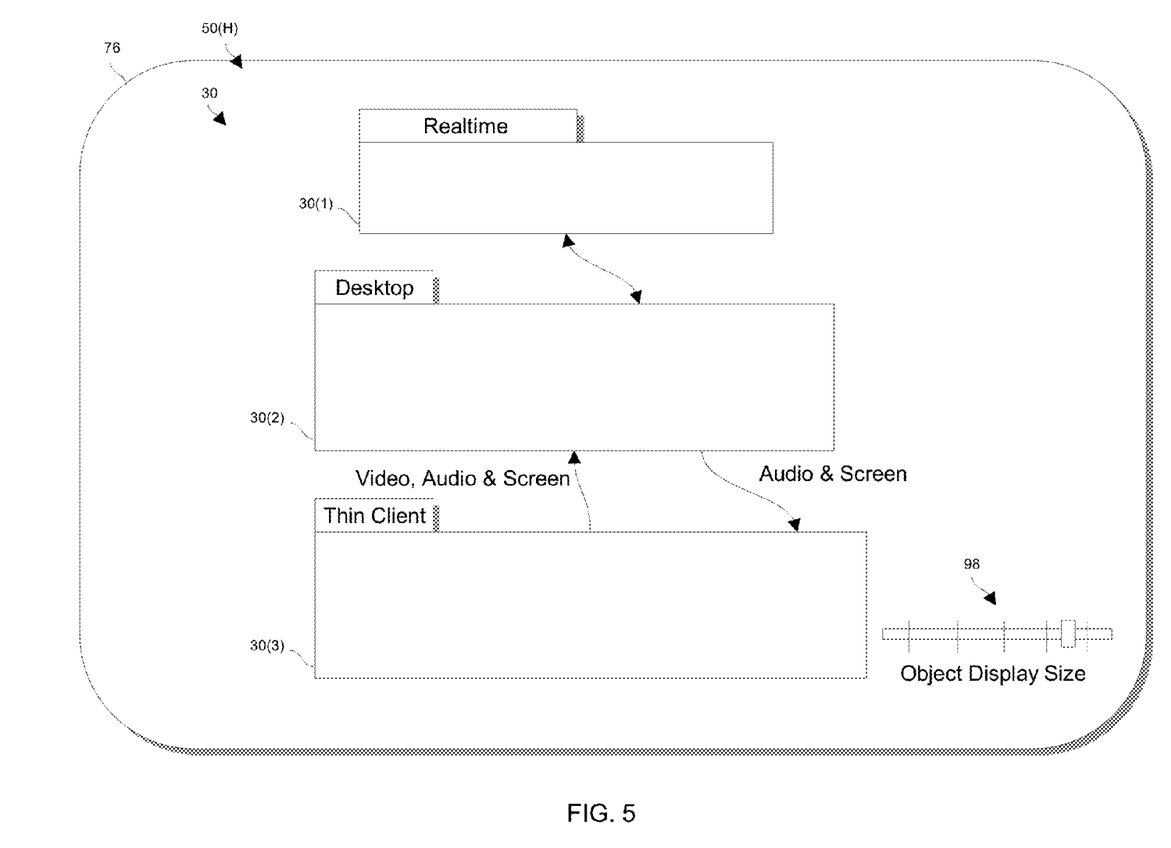
FIG. 5 is an example high-level view of the diagram model of FIG. 1.
Figure 6:
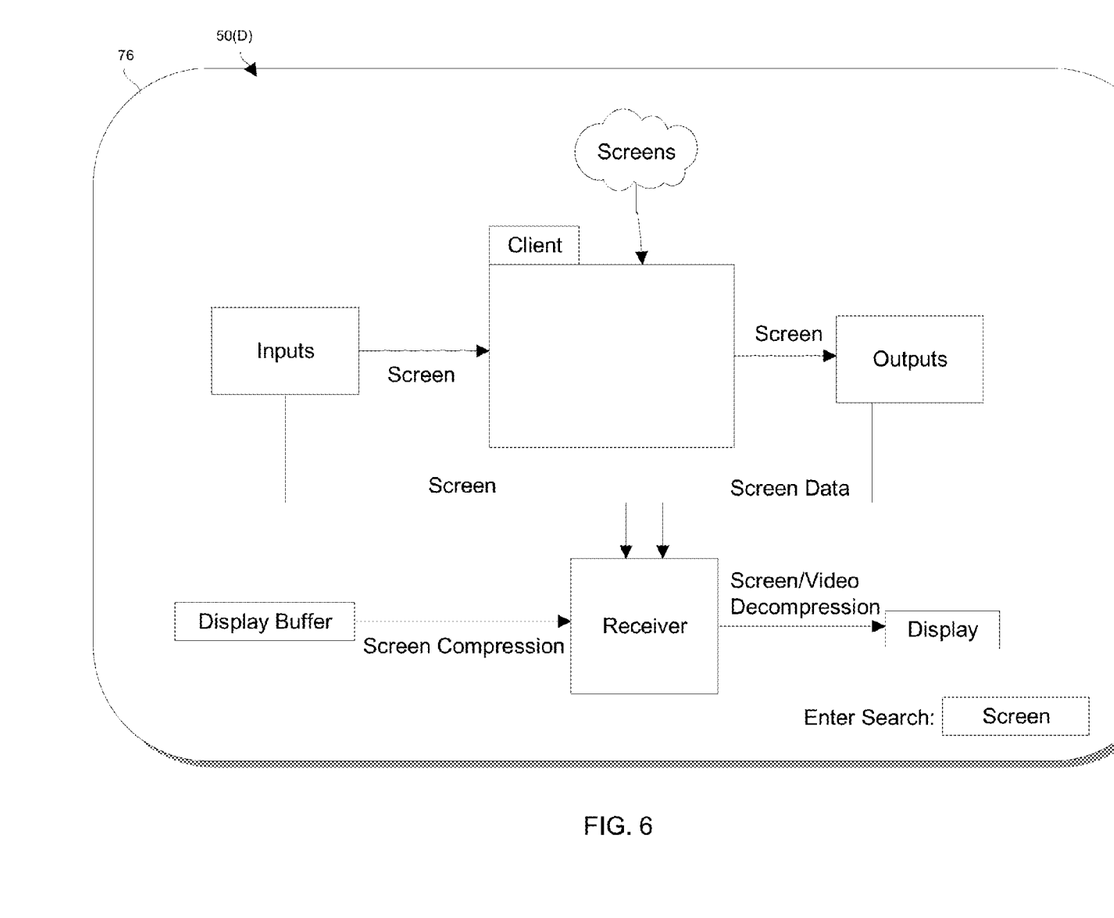
FIG. 6 is an example domain-specific view of the diagram model of FIG. 1.

FIGS. 3 through 6 are example views 50 of the diagram model 20 from various levels and/or perspectives (also see FIG. 1) that can be rendered on a display of an electronic device (e.g., see the electronic display 76 in FIG. 2). FIG. 3 shows an example mid-level view of the diagram model 20 of FIG. 1. FIG. 4 shows an example low-level view of the diagram model 20 of FIG. 1. FIG. 5 shows an example high-level view of the diagram model 20 of FIG. 1. FIG. 6 shows an example domain-specific view of the diagram model 20 of FIG. 1.

As shown by FIGS. 3 through 6, a user operating the electronic apparatus 60 is able to display different views 50 of the diagram model 20 on the electronic display 76 based on a variety of display criteria. To this end, it should be understood that each object 30, 32, 34 of the diagram model 20 has a variety of attributes or parameters such as a size parameter, a location, a label, a label font size, and so on. The user is able to operate a control panel (e.g., a portion of a graphical user interface) which may include buttons, sliders, drop down menus, text fields, and so on to precisely identify how the objects of the diagram model 20 should be displayed.

For example, suppose that each object has a size parameter which dictates a width of that object. Further suppose that the electronic apparatus 60 maintains a minimum displayable size threshold of 1.0 inch and a maximum displayable size threshold of 4.0 inches (e.g., based on a control panel slider setting 98). If the size parameter of an object falls within the size range defined by these predefined size thresholds, the electronic apparatus 60 displays that object to the user. However, if the size parameter of an object does not fall within the range defined by these predefined size thresholds, the electronic apparatus 60 does not display that object to the user.

It should be understood that other thresholds are suitable for use. Along these lines, in some arrangements, the user identifies the smallest object that is clearly visible on the electronic apparatus 60, and that identification determines the threshold. Such a threshold may be based on clarity, point or pitch size, consumed display area, whether text associated with the object fits, and so on. For example, the threshold initially may be inferred automatically, and then made available as a default setting for the user to adjust later on.

As shown in FIG. 3, the mid-level objects 32 fall within the size range defined by these predefined size thresholds so the electronic apparatus 60 displays the mid-level objects 32 to the user via the electronic display 76. However, in this particular example, the low-level objects 34 were too small (i.e., their widths were less than 1.0 inch) and do not fall within the size range defined by these predefined size thresholds so the electronic apparatus 60 does not display the low-level objects 34 to the user. Similarly, the high-level objects 34 were too large (i.e., their widths were greater than 4.0 inches) and do not fall within the size range defined by these predefined size thresholds so the electronic apparatus 60 does not display the high-level objects 30 to the user.

Once the electronic apparatus 60 determines which objects to display, the electronic apparatus 60 identifies which, if any, relationships 40 to represent. That is, each relationship 40 of the diagram model 20 has a variety of attributes or parameters such as a list of objects to which the relationship 40 pertains, a direction, a label, a label font size, and so on. Accordingly, the electronic apparatus 60 is configured to display, in the form of connecting lines, any relationships 40 between two objects shown in the current view 50. As a result, in FIG. 3, the electronic display 76 renders individual "video", "audio", and "screen" connecting lines between objects 32(1) and 32(2), and individual "screen" and "audio" connecting lines between objects 32(2) and 32(3).

Moreover, the electronic apparatus 60 automatically scales (e.g., magnifies) any text or labels to make it easier for the user to read text of the diagram model 20. For example, the labels "Inputs", "Client", and "Outputs" of the objects 32 are scaled up in order to enable the user to more easily read the labels. Likewise, the labels "Video", "Audio", "Screen" of the connecting lines for the relationships 40 are scaled up to improve readability.

Now, suppose that the user wishes to focus the discussion on a lower level detail of some particular aspect of the diagram model 20. For example, suppose that the user wishes to steer the discussion to the low-level objects 34 of the diagram model 20 (also see FIG. 1). To this end, the user may click on the "Client" object 32(2) in FIG. 3, or adjust the slider 98 of the control panel to a higher magnification. In response, the electronic apparatus 60 displays the low-level objects 34 that are children of the "Client" object 32(2) and that are hidden in FIG. 3.

FIG. 4 shows a low-level view 50(L) that is provided by the electronic display 76 of the electronic apparatus 60. Here, the electronic apparatus 60 shows the low-level objects 34, but hides the high-level objects 30 and the mid-level objects 32 thus simplifying the view and allows the views to focus their attention on the low-level objects 34. Furthermore, the electronic apparatus 60 displays connecting lines for any relationships 40 between the low-level objects 34. Moreover, the electronic apparatus 60 scales up any text or labels to make it easier for the user to read text of the diagram model 20.

It should be understood that the user may be able to continue burrowing down to lower levels in this manner provided that the diagram model 20 contains that level of detail. As a result, the user is able to navigate the electronic apparatus 60 to deeper details of the diagram model 20.

Additionally, the user is able to percolate up to higher levels of the diagram model 20. For example, with reference back to the mid-level view 50(M) of FIG. 3, the user is able to adjust the slider 98 of the control panel to so that the electronic display 76 of the electronic apparatus 60 renders a high-level view 50(H). Here, the electronic apparatus 60 shows the high-level objects 30, but hides the mid-level objects 32 and the low-level objects 34. To this end, the electronic apparatus 60 compares the attributes/parameters of each object 30, 32, 34 to a new size range determined by the slider 98. In particular, if the size parameter of the object falls within the new size range, the electronic apparatus 60 displays that object. Otherwise, the electronic apparatus 60 hides that object from view. Accordingly, the view 50(H) is simplified and allows the viewers to focus their attention on the high-level objects 30.

Additionally, to display relationships 40, the electronic apparatus 60 includes connecting lines for any relationships 40 extending between the high-level objects 30. In this example, the electronic apparatus 60 displays a single double arrow connecting line between the objects 30(1), 30(2) to represent multiple relationships 40 extending between the objects 30(1), 30(2) in the example diagram model 20 (also see FIG. 1). Likewise, the electronic apparatus 60 displays a single arrow connecting line from the object 30(3) to the object 30(2) to represent three inputs from the object 30(3) to the object 30(2), and another single arrow connecting line from the object 30(2) to the object 30(3) (i.e., the opposite direction) to represent two outputs from the object 30(2) to the object 30(3).

Furthermore, the electronic apparatus 60 forms composite text or labels from the individual text or labels of relationships that are represented as single connecting lines. To this end, the electronic apparatus 60 concatenates the text of the represented relationships 40. Moreover, the electronic apparatus 60 scales up any text or labels. In the example, the labels "Realtime", "Desktop", "Thin Client", "Video, Audio & Screen", and "Audio & Screen" are enlarged to make it easier for the user to read text of the diagram model 20. Again, the user may be able to continue navigating to newer high levels provided that the diagram model 20 contains that detail.

FIG. 6 shows an example domain-specific view 50(D) of the diagram model 20 that the electronic display 76 renders when the user has entered a search term (or terms) such as "screen" to identify a particular domain to view. As shown in FIG. 6, the electronic apparatus 60 scans through the text and label parameters of the objects 30, 32, 34 and relationships 40 and displays any objects 30, 32, 34 and connecting lines for any relationships 40 which include the entered search term. Additionally, the electronic apparatus 60 hides the objects 30, 32, 34 and relationships 40 that do not include the search term thus simplifying the view 50(D) so that it only shows a user-selected perspective of the diagram model 20.

In some arrangements, the user is able to perform advanced searches. Along these lines, the user can view any or all objects and relationships from a list of terms (e.g., irrespective of object size). As another example, the user can combine viewing criteria so that the displayed objects and relationships are based on both terms and size, and so on.

In certain arrangements, a relation matches if its name contains a provided keyword. Additionally, an object matches if its name contains a provided keyword, or a relation connecting to that object or to that object's children matches the provided keyword. Further details will now be provided with reference to FIG. 7.

Figure 7:
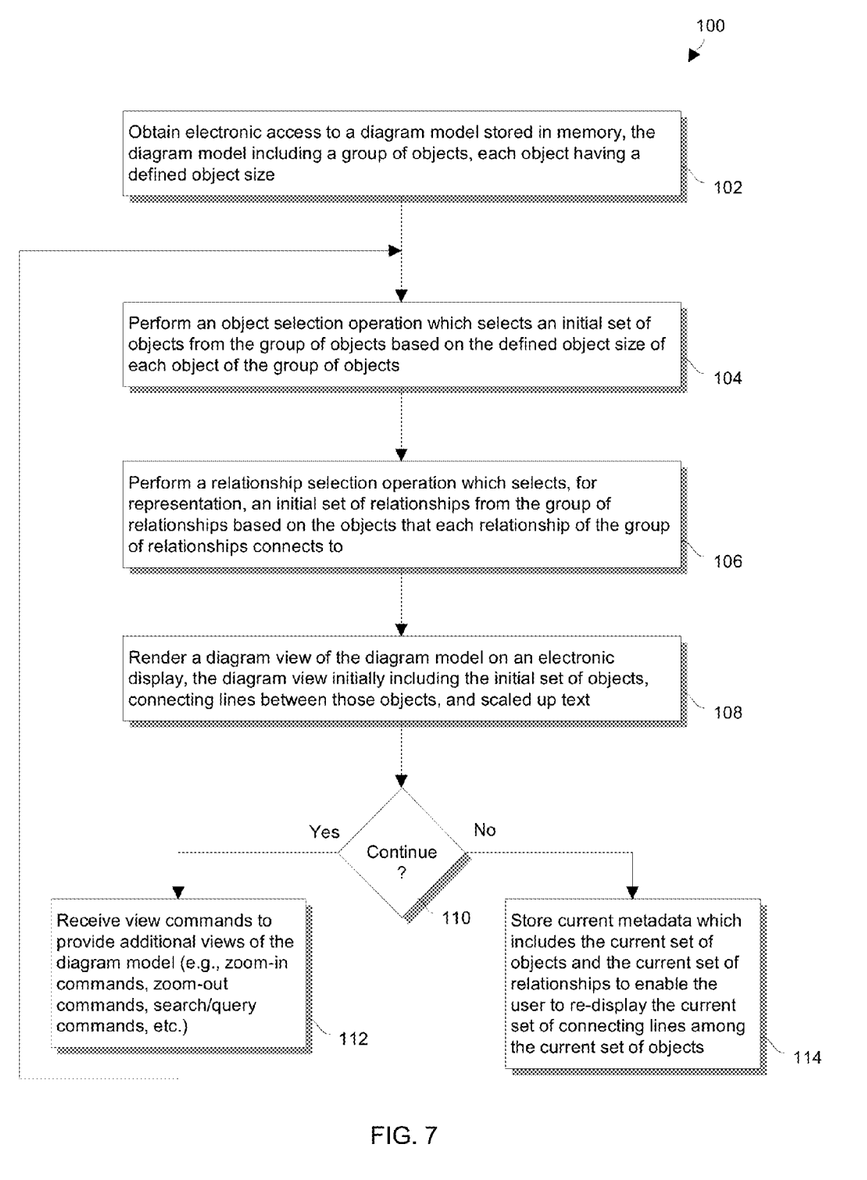
FIG. 7 is a flowchart of a procedure which is performed by the electronic apparatus of FIG. 2.

FIG. 7 is a flowchart of a procedure 100 which is performed by the electronic apparatus 60 (FIG. 2) to provide a set of diagram views of a diagram model 20 to a user. At 102, the electronic apparatus 60 obtains electronic access to the diagram model 20 stored in the memory. As mentioned earlier, the diagram model 20 includes a group of objects, each object having a defined object size.

At 104, after obtaining access to the diagram model 20 stored in the memory, the electronic apparatus 60 performs an object selection operation which selects an initial set of objects from the group of objects based on the defined object size of each object of the group of objects. Along these lines, for each object of the group of objects, the electronic apparatus 60 compares the defined object size of that object to an initial object size range (e.g., a range which is identified by size thresholds), adds that object to the initial set of objects when the defined object size of that object falls within the initial object size range, and omits that object from the initial set of objects when the defined object size of that object does not fall within the initial object size range.

At 106, the electronic apparatus 60 performs a relationship selection operation which selects, for representation in the initial diagram view, an initial set of relationships from the group of relationships. In particular, each relationship of the diagram model 20 is considered based on the objects that the relationship connects to.

At 108, after performing the object selection operation, the electronic apparatus 60 renders an initial diagram view of the diagram model on an electronic display to the user. The initial diagram view includes the initial set of objects, connecting lines between the objects to represent the initial set of relationships, scaled up text, and so on (e.g., see FIG. 3). At this point, the user is able to utilize the information displayed in the initial diagram view.

At 110, the user decides whether to display another view of the diagram model 20. If the user decides to display another view, 110 proceeds to 112. Otherwise, 110 proceeds to 114.

At 112, the electronic apparatus 60 receives a user command to change the current view. For example, the user can operate a zoom control such as a control panel slider setting 98 to a zoom-in command to view new low-level objects and relationships (FIG. 4) or a zoom-out command to view new low-level objects and relationships (FIG. 5). As another example, the user can enter a search command to view specific objects and relationships from a particular perspective or domain (FIG. 6). In such situations, the electronic apparatus 60 re-performs 104 through 108 to display a new diagram view of new low-level objects and relationships (i.e., connecting lines).

At 114, when the user decides to terminate viewing of the diagram model 20, the electronic apparatus 60 stores, in the memory, current metadata which includes the current set of objects and the current set of relationships to enable the user to re-display the current set of connecting lines among the current set of objects after a period of no electronic access to the diagram model 20 stored in the memory. Accordingly, when the user accesses the diagram model 20, the electronic apparatus 60 re-displays the last view that was presented to the user.

As described above, improved techniques are directed to providing, to a user, a set of diagram views 50 of a diagram model 20 stored in memory. In particular, the user is able to work at different levels using a zoom feature which selects which objects (e.g., shapes, graphics, etc.) and associated relations (e.g., lines, arrows, etc.) to display to the user. For example, suppose that a set of initial objects is rendered to the user. When the user zooms in via the zoom feature, the techniques (i) show child objects that were initially hidden from view because they were considered too small to see and (ii) renders associated relations from the initial objects to the child objects (e.g., illustrated as connecting lines between the objects). Furthermore, when the user zooms out via the zoom feature, the techniques (i) show parent objects that were initially hidden from view because they were considered too large to see and (ii) renders associated relations from the initial objects to the parent objects. Moreover, text labels for removed objects/relations can be removed while text labels for currently visible objects/relations can be scaled up so that these text labels are easy for the user to read. In some arrangements, the user is able to focus on specific aspects (or domains) of the diagram model by selecting which objects/relations/domains/etc. the user wants to see.

Additionally, one should appreciate that this above-described techniques amount to more than simply displaying information to a human. Rather, the techniques involve rendered certain objects and relationships to a user based on defined object sizes, while hiding other objects and relationships from the user based on define object sizes. Thus, the user is able to focus attention on the smartly rendered objects and relationships and not be distracted by other information.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic apparatus 60 (FIG. 2) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on. Such modifications and enhancements are intended to belong to various embodiments of the disclosure.

What is claimed is:

1. A method of dynamically rendering, on an electronic display for viewing by a user, a set of diagram model views of content of a file, the method comprising:
    obtaining, by a processing circuitry, data from the content of the file;
    processing, by the processing circuitry, the data to generate a diagram model of the content of the file, the diagram model having at least a first level and a second level of an object hierarchy, each of the first level and the second level including one or more objects, each object of each of the first level and the second level having a plurality of object parameters including at least an object size parameter that defines a size of the object relative to the electronic display;
    storing, by the processing circuitry, the generated diagram model in a memory, wherein the diagram model includes a group of objects included in one or more of the first level and the second level of the object hierarchy and a group of relationships, each relationship of the group of relationships connecting to at least two objects of the group of objects;
    performing, by the processing circuitry, a first object selection operation on the diagram model that selects an initial set of objects from among the group of objects included in the one or more of the first level and the second level of the object hierarchy based on at least the defined size of each object of the initial set of objects, the performed first object selection operation resulting in the selected initial set of objects and a second set of objects that is initially unselected from among the group of objects;
    performing, by the processing circuitry, a relationship selection operation that selects an initial set of relationships from the group of relationships based on the at least two objects that each relationship of the group of relationships connects to;
    automatically rendering, by the processing circuitry, an initial diagram model view of the content of the file on the electronic display for viewing by the user, the rendering of the initial diagram model view displaying the initial set of objects and an initial set of connecting lines among the initial set of objects based on the initial set of relationships and hiding the second set of objects from being displayed on the initial diagram model view, the second set of objects being not visible by the user on the electronic display based on the defined size of each object in the second set of objects relative to the electronic display;
    detecting, by the processing circuitry, a receipt of a user command for performing a second object selection operation on the diagram model that selects the second set of objects from among the group of objects;
    responsive to the detecting of the receipt of the user command comprising of a zoom-out command from the user, comparing, by the processing circuitry, the defined size of each object of the group of objects to a zoom-out object size threshold that is larger than an initial object size threshold;
    in response to the comparing of the defined size for each object of the group of objects to the zoom-out object size threshold, adding, by the processing circuitry, each object to the second set of objects when the defined size of the each object of the group of objects is greater than the zoom-out object size threshold;
    in response to the comparing of the defined size for each object of the group of objects to the zoom-out object size threshold, omitting, by the processing circuitry, each object from the second set of objects when the defined size of the each object of the group of objects is less than the zoom-out object size threshold;
    responsive to the detecting of the receipt of the user command comprising of a zoom-in command from the user, comparing, by the processing circuitry, the defined size of each object of the group of objects to a zoom-in object size threshold that is smaller than an initial object size threshold;
    in response to the comparing of the defined size for each object of the group of objects to the zoom-in object size threshold, adding, by the processing circuitry, each object to the second set of objects when the defined size of the each object of the group of objects is greater than the zoom-in object size threshold;
    in response to the comparing of the defined size for each object of the group of objects to the zoom-in object size threshold, omitting, by the processing circuitry, each object from the second set of objects when the defined size of the each object of the group of objects is less than the zoom-in object size threshold; and
    responsive to the performing of the second object selection operation based on the comparison of the defined size for each object of the group of objects, automatically rendering, by the processing circuitry, a second diagram model view of the content of the file on the electronic display for viewing by the user, the rendering of the second diagram model view displaying the selected second set of objects and a second set of connecting lines among the selected second set of objects and hiding the rendered initial set of objects and the initial set of connecting lines among the initial set of objects from being displayed on the second diagram model view, the second set of connecting lines being different from the initial set of connecting lines.

2. A method as in claim 1, wherein performing the first object selection operation includes:
    for each object of the group of objects, comparing the defined size of that object to the initial object size threshold, adding that object to the initial set of objects when the defined size of that object is greater than the initial object size threshold, and omitting that object from the initial set of objects when the defined size of that object is less than the initial object size threshold.

3. A method as in claim 1, wherein performing the relationship selection operation includes:
    for each relationship of the group of relationships, identifying whether that relationship connects to at least two objects or child objects of the initial diagram view and (i) if so, adding that relationship to the set of relationships and (ii) if not, omitting that relationship from the initial set of relationships.

4. A method as in claim 1, wherein each relationship has a relationship name; and
    wherein displaying the initial set of connecting lines includes:
    forming a single connecting line based on multiple relationships of the initial set of relationships,
    forming a composite connecting line name from relationship names of the multiple relationships, and outputting, in the initial diagram view, the single connecting line and the composite connecting line name to represent the multiple relationships of the initial set of relationships.

5. A method as in claim 4, wherein each relationship name of the multiple relationships has a first text size; and
wherein outputting the single connecting line and the composite connecting line name includes:
presenting the composite connecting line name at a second text size that is greater than the first text size to scale up the composite connecting line name for easy viewing by the user.

6. A method as in claim 1, wherein each object has an object name; and
wherein the method further comprises:
receiving, from the user, the user command, the user command being a search command having a keyword; and
in response to the search command and for each object of the initial set of objects, identifying whether the object name of that object includes the keyword, adding that object to the second set of objects when the object name of that object includes the keyword, and omitting that object from the second set of objects when the object name of that object does not include the keyword.

7. A method as in claim 6, wherein each relationship has a relationship name; and
wherein the method further comprises:
in response to the search command and for each relationship of the initial set of relationships, identifying whether the relationship name of that relationship includes the keyword, adding that relationship to a second set of relationships when the relationship name of that relationship includes the keyword, and omitting that relationship from the second set of relationships when the relationship name of that relationship does not include the keyword, and
based on the second set of relationships, displaying a second set of connecting lines among the second set of objects of the second diagram view.

8. A method as in claim 1, further comprising: storing, in the memory, current metadata that includes the initial set of objects and the initial set of relationships to enable the user to redisplay the initial set of connecting lines among the initial set of objects after a period of no electronic access to the diagram model stored in the memory.

9. A method as in claim 1, further comprising
wherein automatically rendering the second diagram view includes:
automatically rendering the second diagram view of the content of the file on the electronic display for viewing by the user in response to a zoom command, the second diagram view omitting at least some connecting lines of the initial set of connecting lines which was displayed when rendering the initial diagram view.

10. A method as in claim 1, wherein the one or more objects of the first level are parent objects of the one or more objects of the second level, wherein the one or more objects of the second level are child objects of the parent objects of the first level, and wherein performing the first object selection operation on the diagram model includes selecting the initial set of objects from among the parent objects included in the first level based on at least the defined size of each parent object.

11. A method as in claim 10, wherein performing the second object selection operation on the diagram model includes selecting the second set of objects from among the child objects included in the second level based on at least the defined size of each child object.

12. A method as in claim 1, wherein the one or more objects of the first level are parent objects of the one or more objects of the second level, wherein the one or more objects of the second level are child objects of the parent objects of the second level, and wherein performing the first object selection operation on the diagram model includes selecting the initial set of objects from among the child objects included in the second level based on at least the defined size of each child object.

13. A method as in claim 12, wherein performing the second object selection operation on the diagram model includes selecting the second set of objects from among the parent objects included in the first level based on at least the defined size of each parent object.

14. A method as in claim 1, wherein the one or more objects of the first level are parent objects of the one or more objects of the second level, wherein the one or more objects of the second level are child objects of the parent objects of the first level, wherein the initial set of objects includes at least some of the parent objects of the first level and at least some of the child objects of the second level, and wherein automatically rendering the initial diagram view includes automatically rendering a domain-specific view of the diagram model that includes the parent objects and the child objects included in the initial set of objects.

15. A computer program product having a non-transitory computer readable medium that stores a set of instructions to dynamically render, on an electronic display for viewing by a user, a set of diagram model views of content of a file, the set of instructions, when carried out by a computerized circuitry, causing the computerized circuitry to perform a method of:
obtaining, by a processing circuitry, data from the content of the file;
processing, by the processing circuitry, the data to generate a diagram model of the content of the file, the diagram model having at least a first level and a second level of an object hierarchy, each of the first level and the second level including one or more objects, each object of each of the first level and the second level having a plurality of object parameters including at least an object size parameter that defines a size of the object relative to the electronic display;
storing, by the processing circuitry, the generated diagram model in a memory, wherein the diagram model includes a group of objects included in one or more of the first level and the second level of the object hierarchy and a group of relationships, each relationship of the group of relationships connecting to at least two objects of the group of objects;
performing, by the processing circuitry, a first object selection operation on the diagram model that selects an initial set of objects from among the group of objects included in the one or more of the first level and the second level of the object hierarchy based on at least the defined size of each object of the initial set of objects, the performed first object selection operation resulting in the selected initial set of objects and a second set of objects that is initially unselected from among the group of objects;
performing, by the processing circuitry, a relationship selection operation that selects an initial set of relationships from the group of relationships based on the at least two objects that each relationship of the group of relationships connects to;

automatically rendering, by the processing circuitry, an initial diagram model view of the content of the file on the electronic display for viewing by the user, the rendering of the initial diagram model view displaying the initial set of objects and an initial set of connecting lines among the initial set of objects based on the initial set of relationships and hiding the second set of objects from being displayed on the initial diagram model view, the second set of objects being not visible by the user on the electronic display based on the defined size of each object in the second set of objects relative to the electronic display;

detecting, by the processing circuitry, a receipt of a user command for performing a second object selection operation on the diagram model that selects the second set of objects from among the group of objects;

responsive to the detecting of the receipt of the user command comprising of a zoom-out command from the user, comparing, by the processing circuitry, the defined size of each object of the group of objects to a zoom-out object size threshold that is larger than an initial object size threshold;

in response to the comparing of the defined size for each object of the group of objects to the zoom-out object size threshold, adding, by the processing circuitry, each object to the second set of objects when the defined size of the each object of the group of objects is greater than the zoom-out object size threshold;

in response to the comparing of the defined size for each object of the group of objects to the zoom-out object size threshold, omitting, by the processing circuitry, each object from the second set of objects when the defined size of the each object of the group of objects is less than the zoom-out object size threshold;

responsive to the detecting of the receipt of the user command comprising of a zoom-in command from the user, comparing, by the processing circuitry, the defined size of each object of the group of objects to a zoom-in object size threshold that is smaller than an initial object size threshold;

in response to the comparing of the defined size for each object of the group of objects to the zoom-in object size threshold, adding, by the processing circuitry, each object to the second set of objects when the defined size of the each object of the group of objects is greater than the zoom-in object size threshold;

in response to the comparing of the defined size for each object of the group of objects to the zoom-in object size threshold, omitting, by the processing circuitry, each object from the second set of objects when the defined size of the each object of the group of objects is less than the zoom-in object size threshold; and responsive to the performing of the second object selection operation based on the comparing of the defined size for each object of the group of objects, automatically rendering, by the processing circuitry, a second diagram model view of the content of the file on the electronic display for viewing by the user, the rendering of the second diagram model view displaying the selected second set of objects and a second set of connecting lines among the selected second set of objects and hiding the rendered initial set of objects and the initial set of connecting lines among the initial set of objects from being displayed on the second diagram model view, the second set of connecting lines being different from the initial set of connecting lines.

16. A computer program product as in claim 15, wherein each relationship has a relationship name;
wherein each relationship name has a first text size; and
wherein displaying the initial set of connecting lines includes:
forming a single connecting line based on multiple relationships of the initial set of relationships,
forming a composite connecting line name from the relationship names of the multiple relationships, and
presenting, in the initial diagram view, the composite connecting line name at a second text size that is greater than the first text size to scale up the composite connecting line name for easy viewing by the user.

17. A computer program product as in claim 16, further comprising:
storing, in the memory, current metadata that includes the initial set of objects and the initial set of relationships to enable the user to redisplay the initial set of connecting lines among the initial set of objects following a period of no electronic access to the diagram model stored in the memory.

18. An electronic apparatus for dynamically rendering, on an electronic display for viewing by a user, a set of diagram model views of content of a file, comprising:
an electronic display;
a memory; and
a control circuitry coupled to the electronic display and the memory, the memory storing instructions that, when carried out by the control circuitry, cause the control circuitry to:
obtain data from the content of the file;
process the obtained data to generate a diagram model of the content of the file, the diagram model having at least a first level and a second level of an object hierarchy, each of the first level and the second level including one or more objects, each object of each of the first level and the second level having a plurality of object parameters including at least an object size parameter that defines a size of the object relative to the electronic display;
store the generated diagram model in the memory, wherein the diagram model includes a group of objects included in one or more of the first level and the second level of the object hierarchy and a group of relationships, each relationship of the group of relationships connecting to at least two objects of the group of objects;
perform a first object selection operation on the diagram model that selects an initial set of objects from among the group of objects included in the one or more of the first level and the second level of the object hierarchy based on at least the defined size of each object of the initial set of objects, the performed first object selection operation resulting in the selected initial set of objects and a second set of objects that is initially unselected from among the group of objects;
perform a relationship selection operation that selects an initial set of relationships from the group of relationships based on the at least two objects that each relationship of the group of relationships connects to;
automatically render an initial diagram model view of the content of the file on the electronic display for viewing by the user, the render of the initial diagram model view displaying the initial set of objects and an initial set of connecting lines among the initial set of objects based on the initial set of relationships and hiding the second set of objects from being displayed on the initial diagram model view, the second set of objects being not visible by the user on the electronic display based on the defined size of each object in the second set of objects relative to the electronic display;

detect a receipt of a user command for performing a second object selection operation on the diagram model that selects the second set of objects from among the group of objects;

responsive to the detection of the receipt of the user command comprising of a zoom-out command from the user, compare the defined size of each object of the group of objects to a zoom-out object size threshold that is larger than an initial object size threshold;

in response to the comparison of the defined size for each object of the group of objects to the zoom-out object size threshold, add each object to the second set of objects when the defined size of the each object of the group of objects is greater than the zoom-out object size threshold;

in response to the comparison of the defined size for each object of the group of objects to the zoom-out object size threshold, omit each object from the second set of objects when the defined size of the each object of the group of objects is less than the zoom-out object size threshold;

responsive to the detection of the receipt of the user command comprising of a zoom-in command from the user, compare the defined size of each object of the group of objects to a zoom-in object size threshold that is smaller than an initial object size threshold;

in response to the comparison of the defined size for each object of the group of objects to the zoom-in object size threshold, add each object to the second set of objects when the defined size of the each object of the group of objects is greater than the zoom-in object size threshold;

in response to the comparison of the defined size for each object of the group of objects to the zoom-in object size threshold, omit each object from the second set of objects when the defined size of the each object of the group of objects is less than the zoom-in object size threshold; and responsive of the performance of having performed the second object selection operation based on the comparison of the defined size for each object of the group of objects, automatically render a second diagram model view of the content of the file on the electronic display for viewing by the user, the render of the second diagram model view displaying the selected second set of objects and a second set of connecting lines among the selected second set of objects and hiding the rendered initial set of objects and the initial set of connecting lines among the initial set of objects from being displayed on the second diagram model view, the second set of connecting lines being different from the initial set of connecting lines.

* * * * *